May 29, 1962

T. E. SHOTTON, JR 3,036,382

PORTABLE DRYER UNIT

Filed April 8, 1958

INVENTOR
*Thomas E. Shotton, Jr.*

BY *Mason, Fenwick & Lawrence*

ATTORNEYS

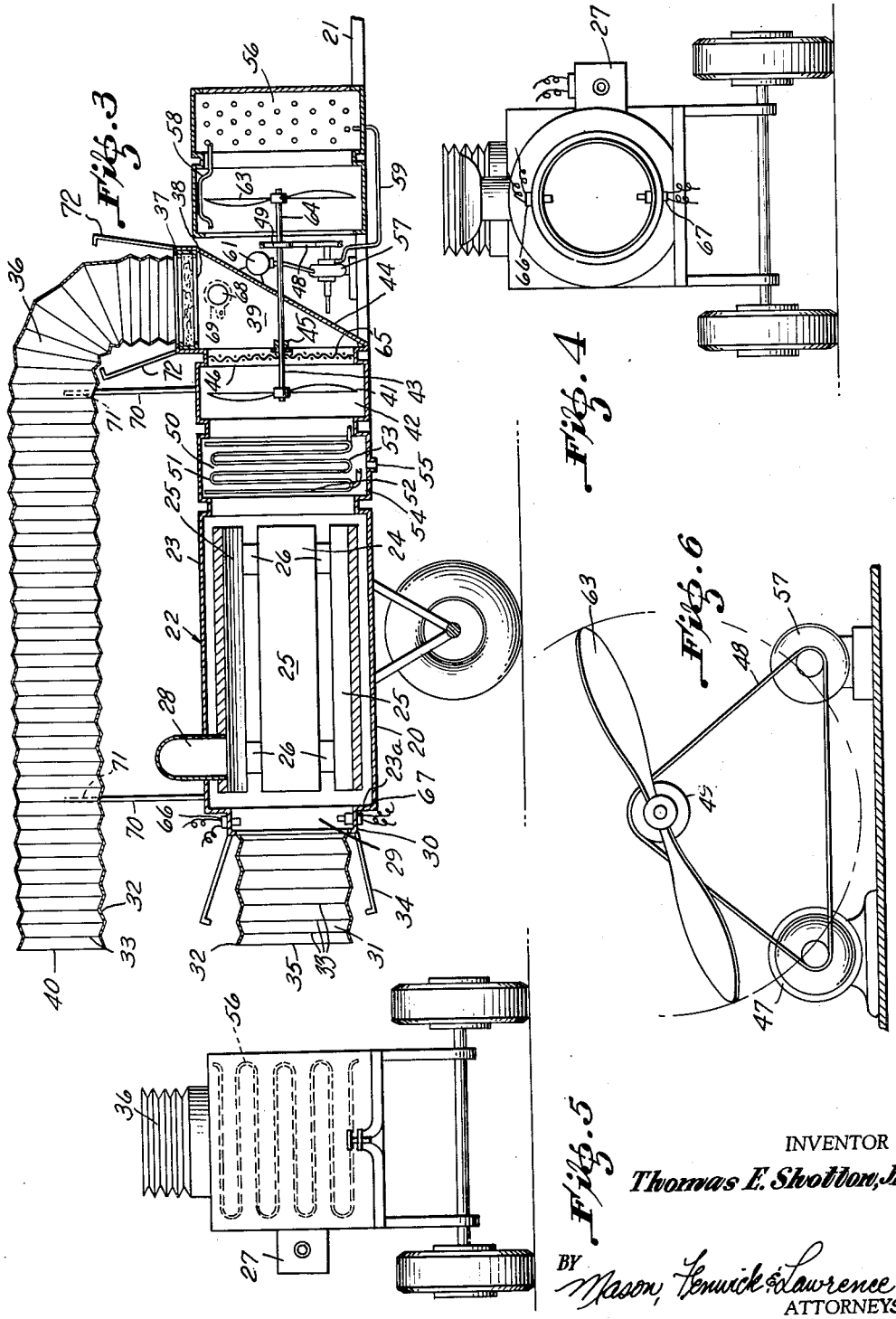

May 29, 1962  T. E. SHOTTON, JR  3,036,382
PORTABLE DRYER UNIT
Filed April 8, 1958  3 Sheets-Sheet 3
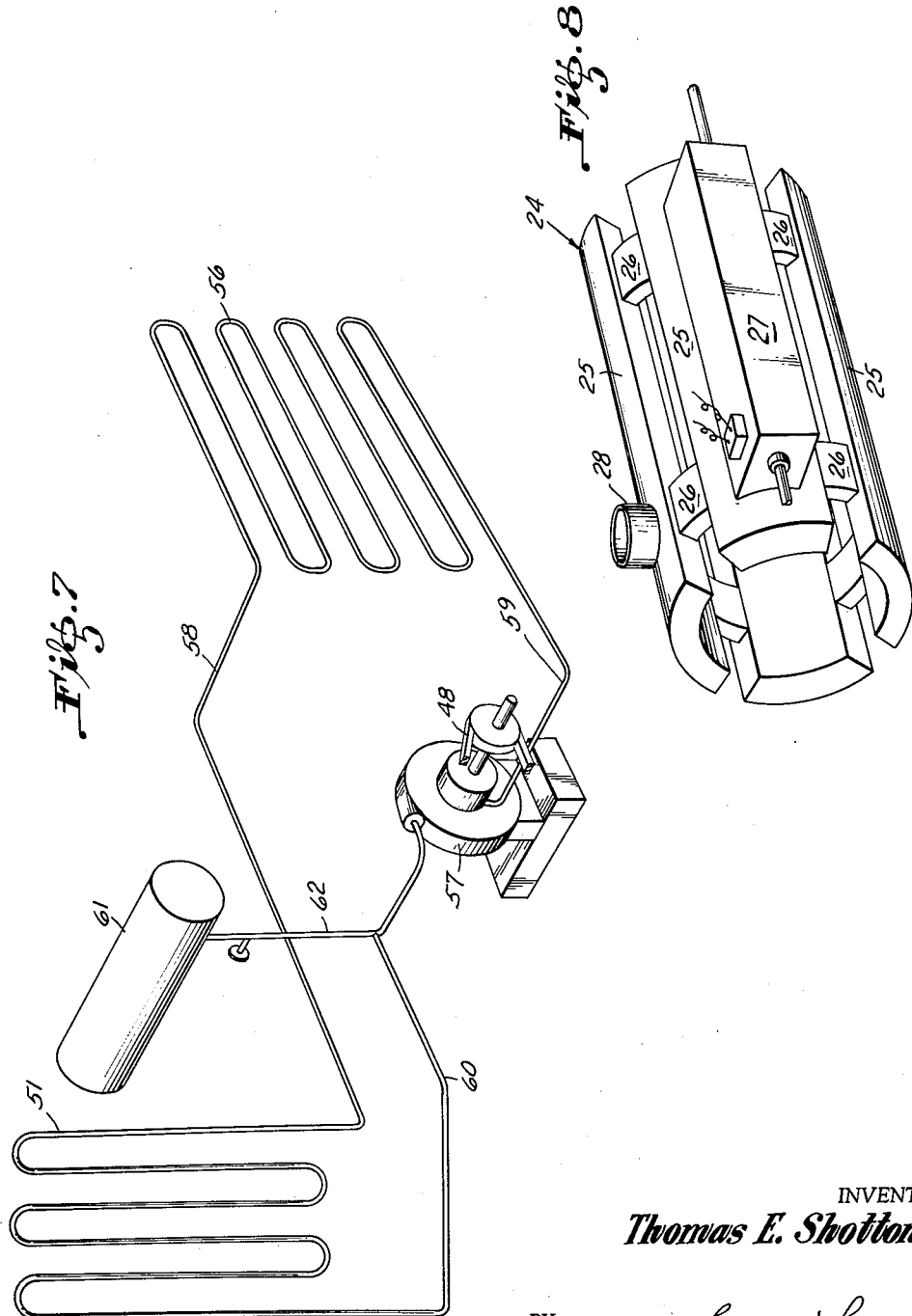
INVENTOR
*Thomas E. Shotton, Jr.*
BY *Mason, Fenwick & Lawrence*
ATTORNEYS

United States Patent Office 3,036,382
Patented May 29, 1962

3,036,382
PORTABLE DRYER UNIT
Thomas E. Shotton, Jr., 615 E. Pinner St., Suffolk, Va.
Filed Apr. 8, 1958, Ser. No. 727,117
2 Claims. (Cl. 34—48)

This invention relates to a dryer for articles to be dried which are stored in bulk form, and more particularly to a portable dryer unit which may be easily transported from one bin, or room of a barn, to another, to dry crop stored in the respective bins, or rooms.

Crops such as corn and peanuts when stored immediately after gathering from the field, will spoil if the moisture content of the crop is too high, and especially if the weather is humid at the time of harvesting.

The dryers for farm crops which are presently known, have the disadvantages of being fixed installations consisting of a room and a heater to which the crop or portion of it is brought and dried, and then moved to the barn or silo in which it is to be stored. The labor of handling the crop in this manner is an expensive part of the cost of the crop. Also in present dryers the method of drying consists in continually taking outside air, heating it to reduce the humidity and blowing it through the crop in the dryer bin. On a very humid day the efficiency of such a dryer is very low and in the process of trying to dry the crop, only by the application of heated air, the crop is likely to be overheated and spoiled.

Dehumidifying equipment in which the air is passed through beds of silica gel or the like are so expensive in first cost that they are beyond the means of the average farmer, and the cost of operating such equipment on a farm would be so high that the market value of the crop would not permit its use.

Consequently, it is an object of the present invention to provide a portable dryer unit which may be easily moved to the crop stored in a bin, silo, or like space in which the crop is to be kept, making it possible to avoid the additional labor of taking the crop first to a drying room and then moving it to the place it is to be stored.

A further object of the present invention is to provide the said portable drying unit with an inexpensive dehumidifying means which will remove some of the humidity from the air and a heating unit which further lowers the relative humidity of the air to be circulated in the space in which the crop is stored.

A still further object of the present invention is the provision of a means incorporated in said portable drying unit for recirculating the air through the storage space, so that the humidity of outside air has the least possible effect on the efficiency of the drying unit.

Another object of the present invention is the provision of such a dryer unit having temperature and humidity controls for throttling the heater and cutting off the dryer when the humidity of the crop has been reduced the desired amount.

Other objects and advantages of the dryer unit will become apparent to one skilled in the art, from the following description when read in conjunction with the accompanying drawings, wherein:

FIGURE 3 is a vertical sectional view taken on the line 3—3 of FIGURE 1, showing the flexible air ducts in extended position;

FIGURE 4 is a rear end elevation showing the conditioned air output opening;

FIGURE 5 is a front end elevation showing the tractor hitch bar and a portion of the liquid cooling system coil illustrated in broken lines;

FIGURE 6 is a vertical end elevational view of the power drive for the air circulation and liquid cooling systems;

FIGURE 7 is a perspective view of the liquid cooling system; and

FIGURE 8 is a perspective view of the indirect-fired air heater.

Figure 1:
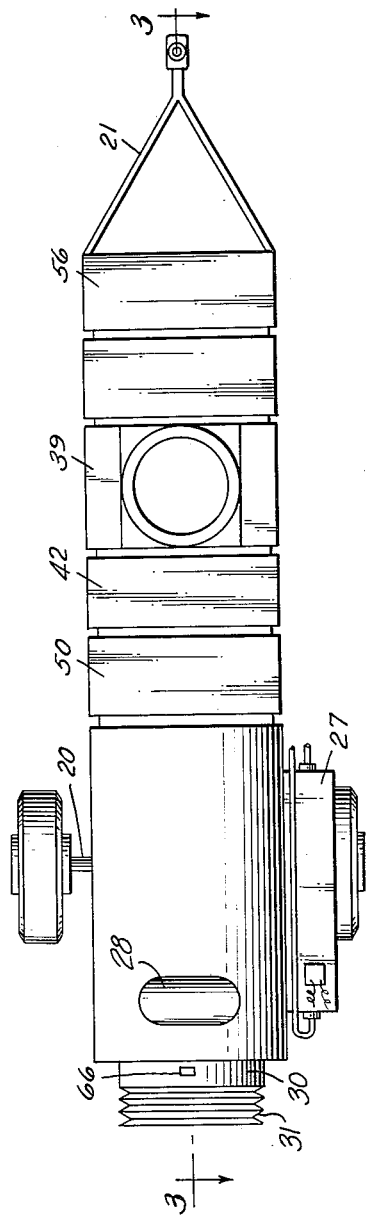
FIGURE 1 is a plan view of the portable dryer unit.
Figure 2:
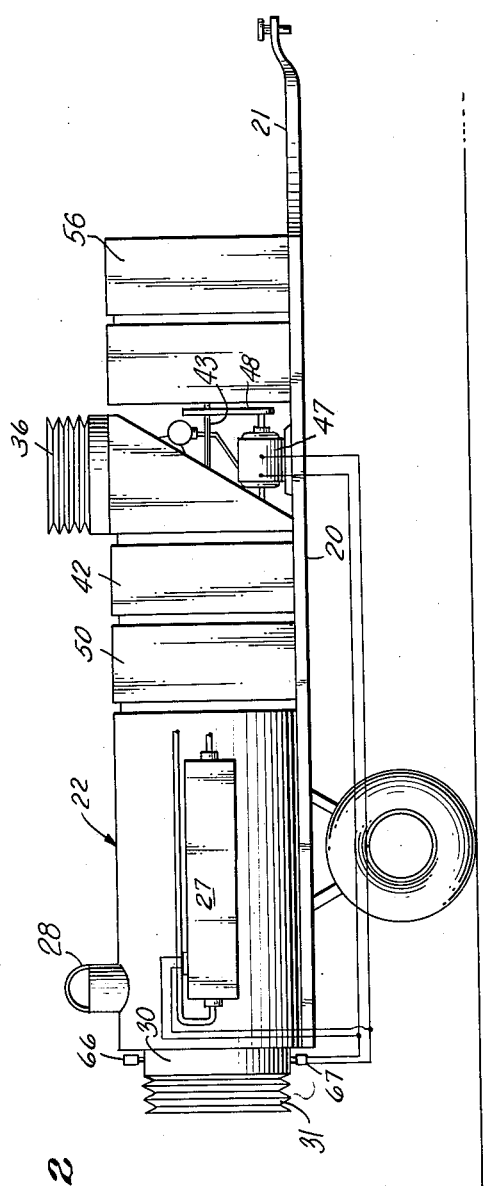
FIGURE 2 is a side elevation of the dryer unit shown in FIGURE 1.

Adverting now to the figures, there is shown at 20 a wheeled vehicular trailer on which the dryer unit of the present invention is mounted. A hitch bar 21 for connecting the trailer to a truck or tractor, not shown, is provided at the front end of the trailer so that the dryer unit may be towed from one barn or silo to another. A heater 22 for heating the air to be used in drying the crop is mounted on the trailer 20 near the rear end thereof. An outer wall 23 of the heater 22 is a welded sheet steel cylinder closed at the outlet end by an outer end wall 23a. A combustion chamber 24 is mounted within the outer wall 23 and spaced therefrom. The combustion chamber 24 is also of welded construction and is made of hollow segments 25 connected by narrow passageways 26, as shown in FIGURE 8, to provide a closed annular chamber within the outer wall 23. A burner compartment 27 is mounted on the outer wall 23 and suitable burner equipment consisting of a burner, fuel pump, and igniter mechanism (not shown) is mounted in the burner compartment 27 with the burner firing into the combustion chamber through a suitably directed tuyere (not shown). The fuel employed may be of the type which is easily portable and available on a farm, such as oil or bottled gas. The tank for the fuel may be suspended on brackets depending from the under side of the chassis of the trailer 20 (not shown).

The combustion chamber 24 is inexpensive to manufacture and provides a large heat exchange area for the air which is forced through the heater by a means soon to be disclosed. It will be apparent, however, that other indirect fired air heaters may be substituted for the example used to illustrate the invention. The air heater used, however, should be of the indirect-fired type, to prevent setting fire to the crop by sparks, and to eliminate the moisture formed by combustion. A stack 28 in communication with the combustion chamber 24 extends through the outer wall 23.

An outlet opening 29 in the end wall 23a has an outstanding collar 30. An extendible duct 31 is fastened on the collar 30. The duct 31 has a tubular airtight flexible covering 32 of heat resistant material, such as plastic, having a high melting point supported by a spring steel helical frame 33, the covering 32 being adhesievly attached to the frame 33 when the frame is extended to the full length of the duct 31 so that the individual spirals of the helical frame 33 will be wide apart when the duct 31 is extended to its limit and may be retracted to a fraction of its extended length. A pair of clamps 34 hold the duct 31 in retracted position when the dryer unit is being transported from one location to another.

The outer end 35 of the duct 31 is placed just inside a doorway at which the dryer unit has been positioned, and rests on the floor of the bin. Outside air may be excluded from the bin by a curtain (not shown) draped over the doorway, and having a hole through which the duct 31 passes.

An extendable return duct 36 is provided for conducting air from the bin to the dryer unit. The duct 36 is constructed of material similar to that of the duct 31, but is of greater length. The duct 36 is connected to a collar 37, which surrounds an opening 38 at the top of an inlet chamber 39 positioned on the trailer 20 forwardly of the heater 22 with which it is in communication. The free end 40 of the duct 36 is placed on top of the crop stored in the bin, at a point as distant as possible from the end 35, and would pass through a second hole in the curtain draped over the doorway, near the top of the doorway. A primary fan 41, which is conveniently shown in FIGURE 3 as being of the propeller type is positioned in a primary fan chamber 42, being mounted on a shaft 43 suitably journaled in the angled wall 44 of the inlet chamber 39 and a spider bracket 45 having arms which extend across the inter-communicating passageway 46 between the return chamber and the fan chamber. The fan 41 is driven by a suitable motor 47, such as an electric motor, through a belt 48 over a pulley 49 secured on the shaft 43.

The primary fan chamber 42 communicates at the end opposite to the inlet chamber 39 with a dehumidifying chamber 50. A cooling coil 51 is mounted within the dehumidifying chamber 50, the cooling coil 51 being formed with long vertical flights 52 and short horizontal flights 53. A drain pan 54 is formed in the bottom of the dehumidifying chamber 50. A drainage outlet 55 is provided in the bottom of the drain pan 54.

When the air ducts 31 and 36 are placed in a bin containing a crop to be dried and the fan 41 is started, air from the bin is drawn through the air duct 36, the inlet chamber 39, and the primary fan chamber 42. It is then forced between the flights of the cooling coil 51 and through the heater 22 and thence back into the bin through the air duct 31, establishing a circulation of air through the bin and the dryer unit.

The cooling coil 51 is maintained at a temperature which is cooler than the air in the bin containing the crop to be dried, by the circulation of a liquid cooling medium, such as water, through the coil. Heat which is removed from the air passing over the coil is transferred to a point outside of the air circulatory system of the dryer and dissipated in the following manner, as best seen in FIGURE 7.

The cooling coil 51, through which water or other suitable heat transfer liquid circulates, is connected with a radiator 56 located outside of the air circulation system of the dryer. A pump 57, driven by the motor 47 through the belt 48, circulates water through the radiator 56 and the cooling coil 51. A pipeline 58 conducts the water from the cooling coil 51 to the radiator 56, and pipelines 59 and 60 conduct the water to the pump 57 and back to the cooling coil 51. A tank 61 to hold make-up water for the system is connected into the pipelines 60 by a valved pipe 62.

A radiator fan 63 is mounted on an extension 64 of the shaft 43 to blow air through the radiator 56 to more efficiently dissipate heat from the radiator coil, so that the temperature of the cooling coil 51 is lower than the heated humid air being drawn from the bin. When the hot humid air passes over the cooler surfaces of the coil, a portion of the moisture in the air is condensed on the coil 51 and drops into the drain pan 54 and thence to outside the dryer unit through the drain outlet 55.

A trash filter 65 is mounted across the flow of air from the inlet chamber 39. The trash filter 65 may be conveniently mounted on the arms of the spider bracket 45, and serves the purpose of preventing trash from clogging the cooling coil 51.

A thermostat 66 is connected in well-known manner (not shown) with the burner equipment to cut off the burner when the air at the outlet opening 29 reaches a predetermined maximum safe temperature.

An automatic humidity control 67 is also installed in the air circulation system to cut off the burner and the liquid cooling system when the circulating air has reached a relative humidity which is correlated with the amount of moisture that may be tolerated in the crop for safe curing. The humidity control 67 is shown located at the outlet of the heater 22. It may also be located in the inlet chamber 39. Since the humidity control 67 does not measure the humidity in the crop directly, but is operated on the basis of correlating the humidity of the crop with the humidity of the air after it is circulated through the crop, the location of the control as shown in FIG. 3 permits operation of the control at a lower humidity level which makes for a more sensitive control.

A port 68 having a cover plate 69 is provided in the wall of inlet chamber 39 so that fresh air may be admitted to the stream of recirculating air, as this may be desirable in some cases where a crop has suffered some damage from mold or mildew in the field before it is brought in for storage. Admission of fresh air for a portion of the drying time will improve the odor and condition of the crop.

A plurality of supports 70 upstanding from the top of the wall of the heater 22 and fan chamber 42 have a semi-circular cradle 71 at their top ends to support the return duct 36 a safe distance away from the heater wall 23 so that the plastic covering will not be damaged by heat when the dryer is in operation with the return duct 36 in place in the bin. Clamps 72, similar to clamps 34, are provided for holding the duct 36 in retracted position.

The dryer unit of the present invention provides the farmer with a relatively inexpensive means for drying his crops. Being a portable self-contained unit it eliminates the labor required for taking a crop first to a dryer room and then to its place of storage; it is inexpensive to operate since a saving in fuel is effected by recirculation and control of the temperature of the air; the dehumidifying system is inexpensive, trouble-free and adds practically nothing to the cost of operation. The system operates on the principle that air which is saturated with moisture will give up a portion of the moisture in proportion to the amount of cooling. Since the crops to be dried with the present dryer are harvested in late summer or fall the differential between the outside temperature and a safe bin temperature is such that the cooling coil may be maintained at a temperature which will remove an appreciable amount of moisture from the circulating air in the dryer. The dryer is automatically controlled and therefore may be put into operation at night when there would be the greatest temperature differential between the heated bin and the outside air, and it would automatically cut off when the crop is dry.

For purposes of illustrating the invention an electric motor has been shown for driving the fans and water circulating pump. However it can readily be seen that if electric power is not available this could be accomplished with a small gasoline engine and such an engine could also drive a generator to furnish current to operate the oil burner and controls, making the unit entirely independent of any outside source of power.

While there has been disclosed in the foregoing description a practical embodiment of the portable dryer unit for drying farm crops stored in an enclosure in accordance with the present invention, it will be understood by those skilled in the art that the unit will be equally suitable for drying other articles and that variations in the implementation of the concept of the invention are within the purview and scope of the invention.

What is claimed is:

1. A portable dryer unit to be positioned in an area outside of an enclosure for drying articles stored therein comprising a portable platform, an indirect-fired heater having a capacity to elevate the temperature of said enclosure substantially above the temperature of said outside area and mounted on said platform and having an air passageway therethrough with inlet and outlet openings at the ends of said heater, an air duct adapted to be mounted at the outlet end of said heater and extendible into said enclosure, a dehumidifying chamber providing an air passageway therethrough mounted on said platform adjacent the air inlet opening of said heater and in communication with said heater, a dehumidifying coil in the air passageway of said dehumidifying chamber in heat exchange relation with air passing through said dehumidifying chamber and a fan chamber mounted on said platform adjacent said dehumidifying chamber and in communication therewith, an air blower mounted in said fan chamber to exhaust into said dehumidifying chamber, said fan chamber having an inlet opening in the wall of said chamber on the intake side of said blower, an air duct mounted at said inlet opening in the wall of said fan chamber and extendible to said enclosure, means for operating said blower to recirculate air drawn from said enclosure through said dehumidifying coil in said dehumidifying chamber said heater and said enclosure in a continuous path to elevate the temperature in said enclosure substantially above the temperature of said outside area and cause moisture to be extracted at said surface of said dehumidifying coil, an atmospheric heat exchanger on said platform outside of said continuous path of recirculating air including fluid carrying tubes, means for forcing ambient air over said fluid carrying tubes, conduit means connecting said fluid carrying tubes of said heat exchanger with said dehumidifying coil in a closed system, pump means interposed in said closed system for continuously circulating a heat exchange medium through said dehumidifying coil and said heat exchanger tubes to maintain the temperature of said dehumidifying coil at substantially the temperature of said outside area, automatic humidity control means comprising a humidity sensing means located in the path of air circulating through said dryer unit, and means responsive to said sensing means to terminate operation of said heater and said pump means when the humidity of the circulating air has reached a predetermined level.

2. A self-contained portable dryer unit for positioning in an area outside of an enclosure in which a harvested farm crop has been stored and coupling therewith to reduce the moisture content of said crop comprising a wheeled vehicle, a housing mounted on said wheeled vehicle and having an inlet and an outlet and a passageway for an ambulant current of air extending therebetween, extendible non-collapsible ducts adapted to couple each end of said passageway with said enclosure, an indirect-fired heater having a capacity to raise the temperature of said enclosure substantially above the temperature of said outside area and mounted within said housing adjacent said outlet and extending into said passageway in heat exchange relation with the ambulant current of air in said passageway, an air blower mounted in said passageway adjacent said inlet of said housing, a dehumidifying coil mounted in said passageway between said heater and said blower in heat exchange relation with said ambulant current of air, an atmospheric heat exchanger mounted exterior of said passageway including fluid carrying tubes, means for forcing ambient air over said tubes, piping means connecting said tubes with said dehumidifying coil in a closed system, a pump interconnected in said closed system with said dehumidifying coil and said heat exchanger for sequentially circulating a liquid heat transfer medium in said dehumidifying coil and said heat exchanger to maintain said dehumidifying coil at substantially the temperature of said outside area by a simple heat exchange, power means to drive said blower and said pump to raise the temperature of said enclosure above the temperature of said outside area and extract moisture from said ambulant current of air by continuously circulating said current of air through said enclosure and said dryer unit and continuously circulating said liquid heater transfer medium through said dehumidifying coil and said heat exchanger, automatic humidity control means comprising a humidity sensing means located in said passageway, and means responsive to said sensing means and operatively coupled with said heater and said power means to terminate operation of said heater and said pump when the humidity of the air in said passageway has reached a predetermined level.

References Cited in the file of this patent
UNITED STATES PATENTS

| | | |
|---|---|---|
| 212,955 | Luckenbach | Mar. 4, 1879 |
| 1,262,842 | Randolph | Apr. 16, 1918 |
| 1,827,099 | Otis | Oct. 13, 1931 |
| 1,888,242 | Sholtes | Nov. 22, 1932 |
| 1,913,659 | Chester | June 13, 1933 |
| 1,986,863 | Terry | Jan. 8, 1935 |
| 2,050,254 | Barnsteiner | Aug. 11, 1936 |
| 2,343,346 | Touton | Mar. 7, 1944 |
| 2,443,443 | Chavannes | June 15, 1948 |
| 2,480,441 | Bingham | Aug. 30, 1949 |
| 2,570,808 | Hermes | Oct. 9, 1951 |